(12) United States Patent
Kanehiro (10) Patent No.: US 7,916,208 B2
(45) Date of Patent: Mar. 29, 2011

(54) IMAGE PROCESSOR, DIGITAL CAMERA, AND METHOD FOR PROCESSING IMAGE DATA

(75) Inventor: Makoto Kanehiro, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 429 days.

(21) Appl. No.: 12/173,049

(22) Filed: Jul. 15, 2008

(65) Prior Publication Data

US 2009/0027543 A1   Jan. 29, 2009

(30) Foreign Application Priority Data

Jul. 26, 2007   (JP) ................. 2007-194522

(51) Int. Cl.
*G03B 13/00* (2006.01)
*H04N 5/232* (2006.01)
*G06K 9/40* (2006.01)
(52) U.S. Cl. ......... 348/354; 348/349; 348/345; 382/264
(58) Field of Classification Search .................. 348/342, 348/240.99–240.3, 239; 382/264
See application file for complete search history.

(56) References Cited

U.S. PATENT DOCUMENTS

| 7,187,407 | B2 | 3/2007 | Kanehiro et al. | |
|---|---|---|---|---|
| 2002/0021361 | A1 | 2/2002 | Kitajima et al. | |
| 2004/0056974 | A1 | 3/2004 | Kitajima et al. | |
| 2005/0097475 | A1 | 5/2005 | Makioka et al. | |
| 2005/0134719 | A1* | 6/2005 | Beck .................. | 348/333.11 |
| 2005/0195317 | A1* | 9/2005 | Myoga .................. | 348/370 |
| 2005/0196040 | A1 | 9/2005 | Ohara | |
| 2005/0220358 | A1* | 10/2005 | Blonde et al. .................. | 382/264 |
| 2006/0082677 | A1* | 4/2006 | Donomae et al. ............. | 348/362 |

FOREIGN PATENT DOCUMENTS

| JP | 10-285417 | 10/1998 |
|---|---|---|
| JP | 2001-016537 | 1/2001 |
| JP | 2001-35898 | 12/2001 |
| JP | 2002-320130 | 10/2002 |
| JP | 2002-354309 | 12/2002 |
| JP | 2004-007483 | 1/2004 |
| JP | 2004-015662 | 1/2004 |
| JP | 2004-070176 | 3/2004 |
| JP | 2004-077527 | 3/2004 |
| JP | 2004-077528 | 3/2004 |
| JP | 2004-104725 | 4/2004 |
| JP | 2005-020045 | 1/2005 |
| JP | 2005-203994 | 7/2005 |
| JP | 2005-229326 | 8/2005 |
| JP | 2005-250847 | 9/2005 |
| JP | 2005-091430 | 10/2006 |
| JP | 2006-330414 | 12/2006 |

\* cited by examiner

*Primary Examiner* — Sinh Tran
*Assistant Examiner* — Christopher K Peterson
(74) *Attorney, Agent, or Firm* — Dickstein Shapiro LLP (57) ABSTRACT

An image processor including an object extracting device extracting an object region from original image data; an object separating device separating the object region from the other region; a first filter subjecting the object region to out-of-focus filtering processing to output first image data; a second filter subjecting the other region to out-of-focus filtering processing to output second image data; an image synthesizing device synthesizing the first and second image data; a displaying device displaying the synthesized image data and original image data; a region splitting device splitting the synthesized image data into plural regions; a high-frequency component obtaining device obtaining high-frequency components in each of the plural regions; a high-frequency component analyzing device analyzing the high-frequency components; and a zooming device zooming a region among the plural regions having higher frequency components.

7 Claims, 7 Drawing Sheets

# IMAGE PROCESSOR, DIGITAL CAMERA, AND METHOD FOR PROCESSING IMAGE DATA

BACKGROUND OF THE INVENTION

1. Field of the Invention

The present invention relates to an image processor and a digital camera, which can easily confirm whether an out-of-focus processing (hereinafter sometimes referred to as a blurring processing) is performed. In addition, the present invention also relates to a method for processing image data.

2. Discussion of the Related Art

Published unexamined Japanese patent application No. (hereinafter referred to as JP-A) 2005-229326 discloses a technology concerning cameras and through image displaying methods such that an image, which has been subjected to an image processing such as white balance processing, is displayed in a region while the original image is displayed in another region so that the user can compare the processed image with the original image.

In addition, another technology is proposed in that a blurring processing, which is similar to the above-mentioned blurring processing and to blurring processings, which have been performed on single-lens reflex cameras, is performed on compact digital cameras by processing image data.

However, the technologies have a drawback in that it is impossible for the digital cameras to confirm whether the detailed portions of the displayed images subjected to the blurring processing have a desired image quality. This is because the reproducibility (resolution) of the displays of the digital cameras is relatively low compared to the number of pixels of the processed images, namely the cameras have low resolution. In addition, the camera disclosed in JP-A 2005-229326 does not consider a case where users confirm whether a detailed portion of the displayed images subjected to the blurring processing has a desired image quality.

Because of these reasons, a need exists for an image processor and a digital camera, which can easily confirm whether a blurring processing is performed as desired.

SUMMARY OF THE INVENTION

As an aspect of the present invention, an image processor is provided, which includes:

an object extracting device configured to extract an object region from original image data;

an object separating device configured to separate the extracted object region from the other region;

a first filtering device (sometimes referred to as a first filter) configured to subject the object region to an out-of-focus filtering processing (sometimes referred to as a blur filtering processing) and to output first image data;

a second filtering device (sometimes referred to as a second filter) configured to subject the other region to an out-of-focus filtering processing and to output second image data;

an image synthesizing device configured to synthesize the first image data and the second image data;

a displaying device configured to display the synthesized image data and the original image data, which are not subjected to the out-of-focus filtering processing;

a region splitting device configured to split the synthesized image data into plural regions;

a high-frequency component obtaining device configured to obtain high-frequency components in each of the plural regions;

a high-frequency component analyzing device configured to analyze the high-frequency components thus obtained by the region splitting device; and a zooming device configured to zoom a region among the plural regions, which has higher frequency components than the other regions of the plural regions.

As another aspect of the present invention, a digital camera is provided, which includes a lens, a shutter, and an image pick-up device (such as CCDs) configured to receive a light image formed by the lens and the shutter, and the image processor mentioned above configured to process the image data of the light image.

As yet another aspect of the present invention, a method for processing image data is provided, which includes:

extracting an object region from original image data;

separating the extracted object region from the other region;

subjecting the object region to an out-of-focus filtering processing to output first image data;

subjecting the other region to an out-of-focus filtering processing to output second image data;

synthesizing the first image data and the second image data;

subjecting the original image data to an out-of-focus filtering processing;

splitting the synthesized image data into plural regions;

obtaining high-frequency components in each of the plural regions;

analyzing the high-frequency components; and displaying the synthesized image data and the original image data, which are not subjected to the out-of-focus filtering processing, while zooming a region among the plural regions, which has higher frequency components than the other regions of the plural regions.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Hereinafter the image processor and the digital camera of the present invention will be explained by reference to drawings.

Figure 1:
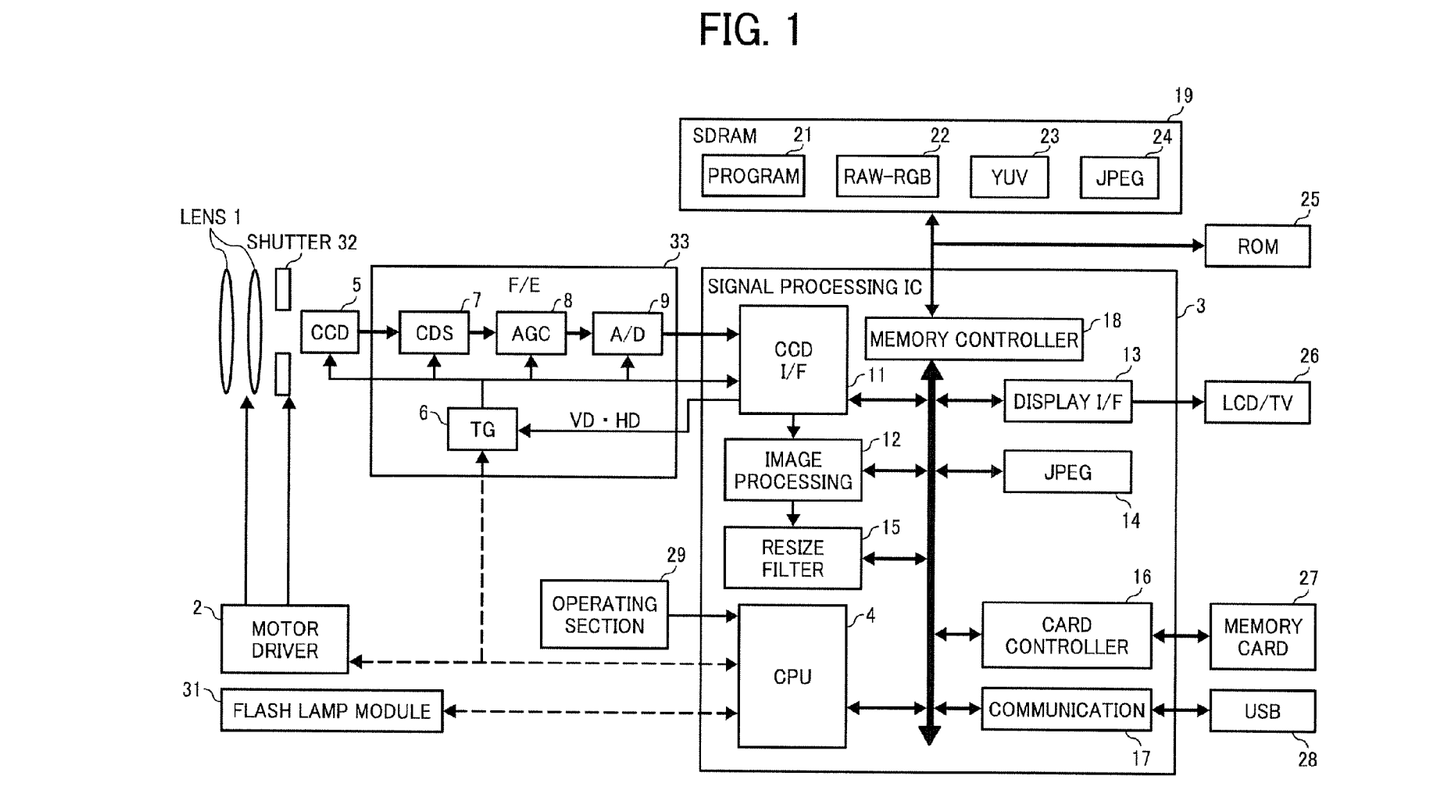
FIG. 1 is a block diagram illustrating the configuration of a digital camera according to an embodiment of the present invention.
Figure 2:
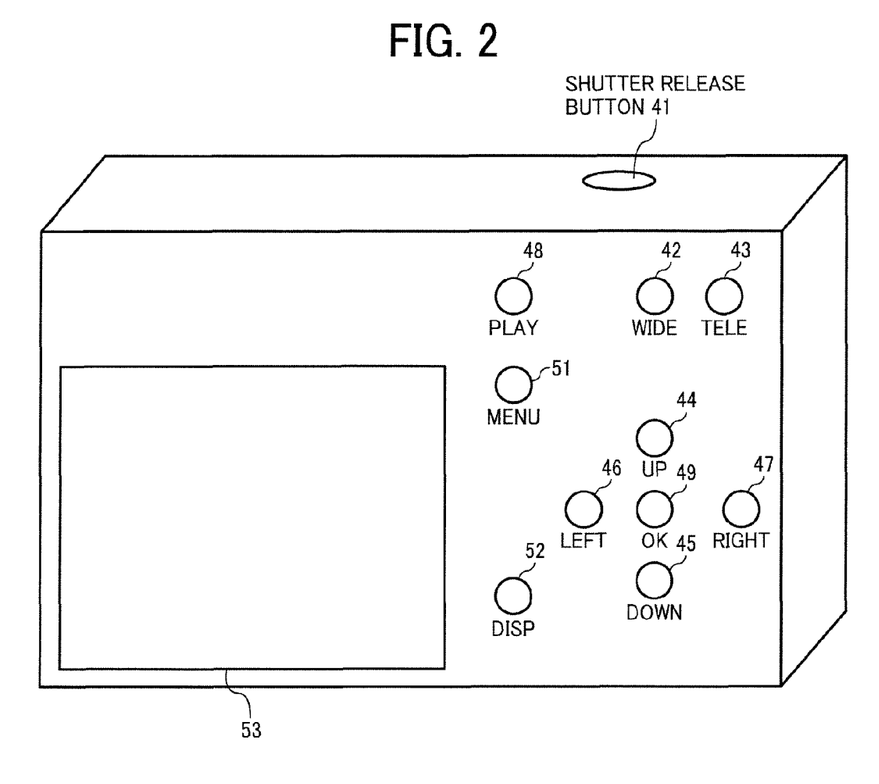
FIG. 2 is a schematic view illustrating the appearance of the digital camera illustrated in FIG. 1.

FIG. 1 is a block diagram illustrating the system configuration of the digital camera according to an embodiment of the present invention. FIG. 2 is a schematic view illustrating the appearance of the digital camera.

At first, the system configuration of the digital camera will be explained by reference to FIG. 1. The camera includes a lens unit including a lens 1 (zoom lens and focusing lens), which is driven by a motor driver 2. The motor driver 2 is controlled by a microcomputer, which includes a central processing unit (CPU) 4 and which is included in a signal processing integrated circuit (IC) 3.

The image pickup section of the camera includes a charge coupled device (CCD) 5, a timing signal generator (TG) 6 configured to drive the CCD 5, a correlated double sampler (CDS) 7 configured to sample image signals from the data output from the CCD 5, an analogue gain controller (AGC) 8, and an A/D converter 9 configured to convert the analogue image signals output from the CCD 5 to digital signals. In this regard, the CDS 7, AGC 8 and A/D converter 9 serve as an analogue front end (AFE) 33. The image pickup section outputs the digital data to the signal processing IC 3. In this regard, the digital data are loaded into the signal processing IC 3 via a CCD interface section 11.

The signal processing IC 3 includes the CCD interface section 11, an image processing section 12, a display interface section 13, a JPEG (joint photographic experts group) codec section 14, a resize filter 15, a card controller 16, a communication interface section 17, a memory controller 18, and the CPU 4. The CCD interface section 11 outputs horizontal synchronizing signals (HD) and vertical synchronizing signals (VD) and receives digital RGB signals that the A/D converter 9 prepares by combining the horizontal synchronizing signals and vertical synchronizing signals. In a monitoring operation, the CCD interface section 11 sends the digital RGB signals to the image processing section 12. The image processing section 12 converts the RGB data to YUV data, and the resize filter 15 converts the image data so that the size thereof is suitable for displaying the image. The thus prepared image data are output to a SDRAM 19.

In a still image shooting status, transfer of the pixels of the CCD5 is performed plural times to send all the pixels. Therefore, the data in each field are written in the SDRAM 19 as RGB data via the memory controller 18. In FIG. 1, the horizontal synchronizing signals (HD) and vertical synchronizing signals (VD) are output from the signal processing IC 3. However, it is possible that the timing signal generator (TG) 6 outputs the signals HD and VD while synchronizing.

The image processing section 12 converts the RGB signals 22, which are sent from the CCD interface section 11 or stored in the SDRAM 19, to YUV data according to the image processing parameters set by a system controlling section.

The resize filter 15 performs size conversions such that the input data (the YUV data and RGB data) are converted so that the size thereof is suitable for recording, displaying or thumbnail-size images. This module has a spatial filtering function. Specifically, in order to reduce deterioration of image qualities (such as formation of zigzag images and mosaic images) caused when the image is enlarged or reduced, the resize filter 15 performs filtering while the setting is changed by the CPU 4 depending on the image qualities and processing speed. In this regard, with respect to the interpolation method, a suitable interpolation method can be selected among plural interpolation methods such as linear interpolation and bicubic interpolation.

For example, since high speed processing is necessary in a monitoring operation, linear interpolation (horizontal interpolation) or filter-off (i.e., simple pixel skipping) is selected. In a still image shooting status, bicubic interpolation is selected because high resolution is necessary for the image. In addition, the resize filter 15 can exercise only the filtering function by setting the resize magnification to 1. With respect to the filtering, high pass filtering in which high spatial frequency components (i.e., edge components of images) are extracted or low pass filtering in which low spatial frequency components are extracted to perform smoothing can be selected.

The JPEG codec section 14 compresses the Y-UV data 23 written in the SDRAM 19 in a recording operation to output data in a JPEG format. In a reproduction operation, the JPEG codec section 14 reads out the data in a JPEG format from the recording medium and extends the JPEG-coded data to YUV data to output the YUV data.

The display interface section 13 sends the image data to be displayed, which are written in the SDRAM 19, to a display device 26 (such as LCDs and TVs) so that the display device displays the still image. In this regard, the display device may be a LCD display device of the camera, a television which receives the image data as TV video signals to display the still image, or the like. In general, the display device has a relatively low resolution compared to the still image to be displayed.

The image processing section 12 performs image processings (such as white balance processing and edge emphasizing processing) on the input image data. In addition, in this example of the present invention, the image processing section 12 performs out-of-focus background processing on the input image data. The card controller 16 performs, according to instructions of the CPU 4, readout of the data, which are stored in a memory card 27, to store the data in the SDRAM 19, and writing of the data, which are stored in the SDRAM 19, in the memory card 27.

The microcomputer serving as an overall controller loads the programs and control data stored in a rewritable ROM 25 on the SDRAM 19 on start-up to control entire the system according to the program code. The microcomputer performs controlling for image pickup operations, setting of image processing parameters for the image processor, memory controlling, and display controlling according to instruction such as external operation instruction using a button in an operating section 29 or a remote control device (not shown), and communication instruction from an external terminal such as personal computers through communication networks.

The communication interface section 17 not only controls the digital camera as mentioned above, but also sends and receives image files to or from personal computers and printers through communication networks. In addition, the version upgrade of the control program can be performed by receiving programs from a personal computer. In FIG. 1, numeral 28 denotes USB (Universal Serial Bus).

The operating section 29 corresponds to, for example, buttons and switches of the camera illustrated in FIG. 2. Namely, by using the operating section, an operator can instruct the camera to perform an operation. Referring to FIG. 2, the operating section 29 includes a shutter release button 41, a WIDE button 42 and a TELE button 43 for setting the magnification of the camera in optical zoom and electronic zoom, and other input devices by which various setting operations such as exposure mode selection and record size selection can be performed. The example of the camera illustrated in FIG. 2 has a cross-form button (up, down, left and right buttons) 44-47, a PLAY button 48, an OK button 49, a MENU button 51 and a DISPLAY button 52, which are used for explaining various operations mentioned below. Numeral 53 denotes a displaying device.

EXAMPLE 1

Example 1 of the image processor and digital camera of the present invention will be explained by reference to drawings. FIGS. 3 to 6 are flowcharts for explaining out-of-focus background processing and display of the image having out-of-focus background.

Figure 3:
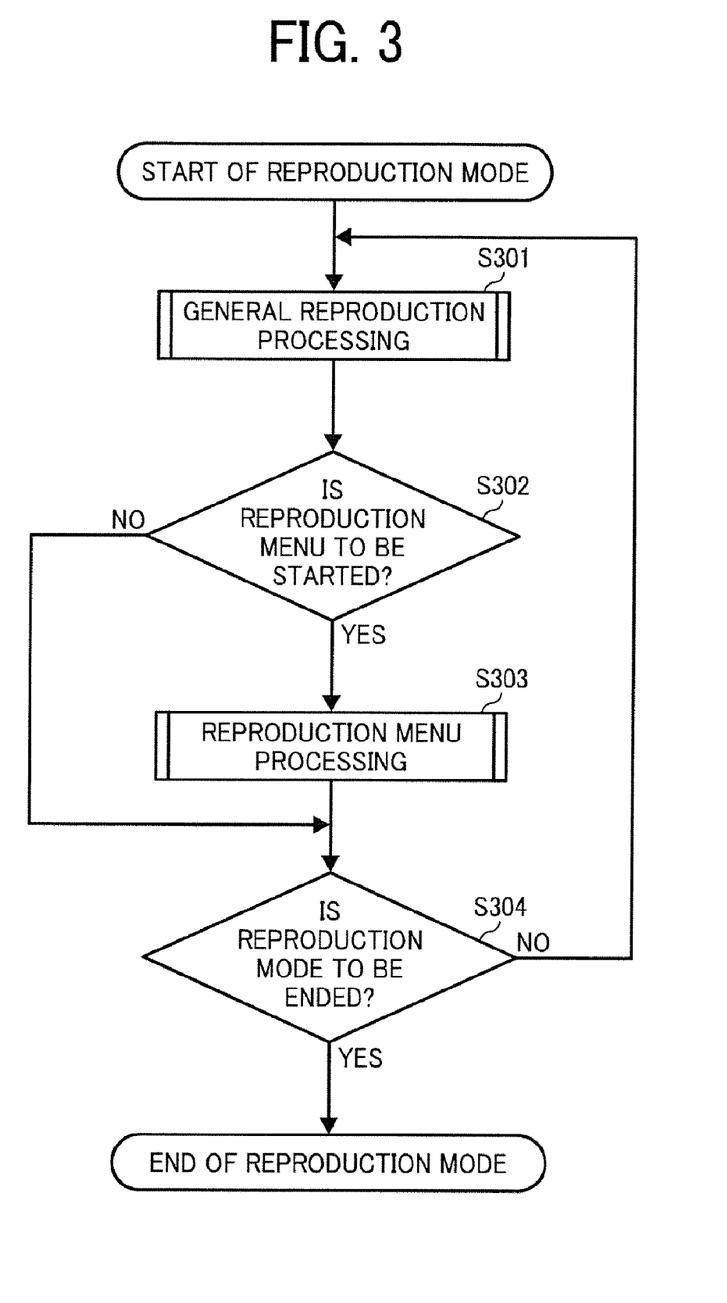
FIGS. 3-6 are flowcharts for explaining the processings performed in the digital camera.

At first, out-of-focus background processing and display of an image having out-of-focus background in a reproduction mode will be explained. The flow of the processing of from start of reproduction mode to end of the reproduction mode is illustrated in FIG. 3. By pushing the PLAY button 48, the operator can observe the recorded images. In this regard, the status attained by pushing the PLAY button 48 is called reproduction mode. When the reproduction mode is attained, image files, which can be reproduced, are displayed in the displaying device 53. Among the image files, the operator selects an image file to be subjected to an out-of-focus background processing. When the operator pushes the RIGHT button 47, the next image file is displayed in the displaying device. In contrast, when the operator pushes the LEFT button 46, the last image file is displayed in the displaying device. Thus, by using the buttons 46 and 47, the image file to be subjected to an out-of-focus background processing can be selected.

Next, the reproduction mode will be explained referring to FIG. 3.

When a reproduction mode is displayed (Step S301), it is determined whether a user instructs to display the reproduction menu (Step S302). When YES is selected in Step S302, the reproduction menu is displayed (Step S303). In this regard, another processing is not performed until the reproduction menu displaying processing is not ended. When NO is selected in Step S302, the reproduction menu is not displayed (i.e., the reproduced image is displayed) and it is determined whether the reproduction mode is ended (Step S304). If the reproduction mode is to be ended (Y in Step S304), the reproduction mode is ended. If not (N in Step S304), the reproduction menu processing is performed again.

In the present application, the "reproduction menu" means a menu image from which a user can instruct whether or not the out-of-focus processing is performed, and an image from which a user can instruct whether a list of reduced images is displayed or zoom display is performed.

Figure 4:
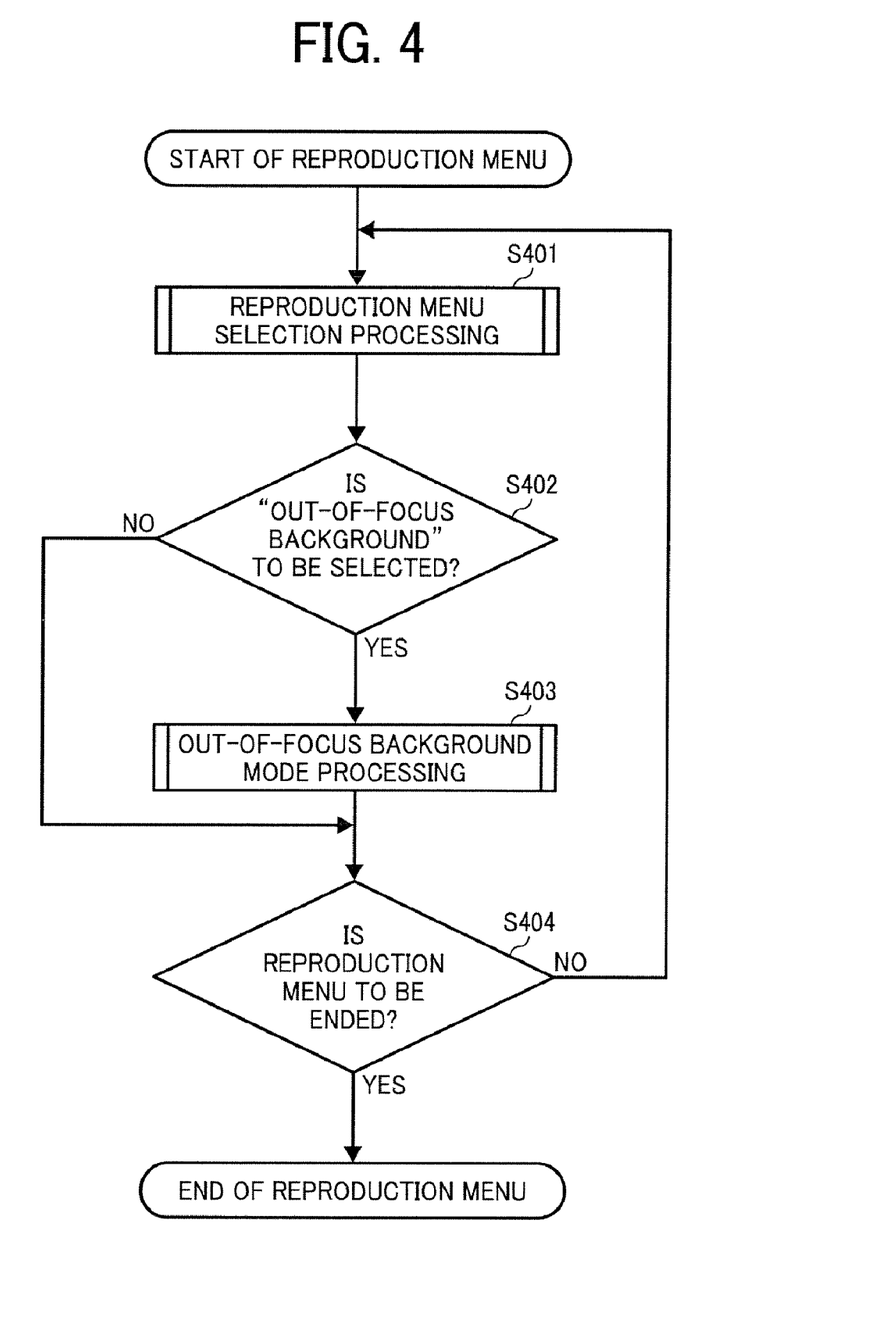
Figure 5:
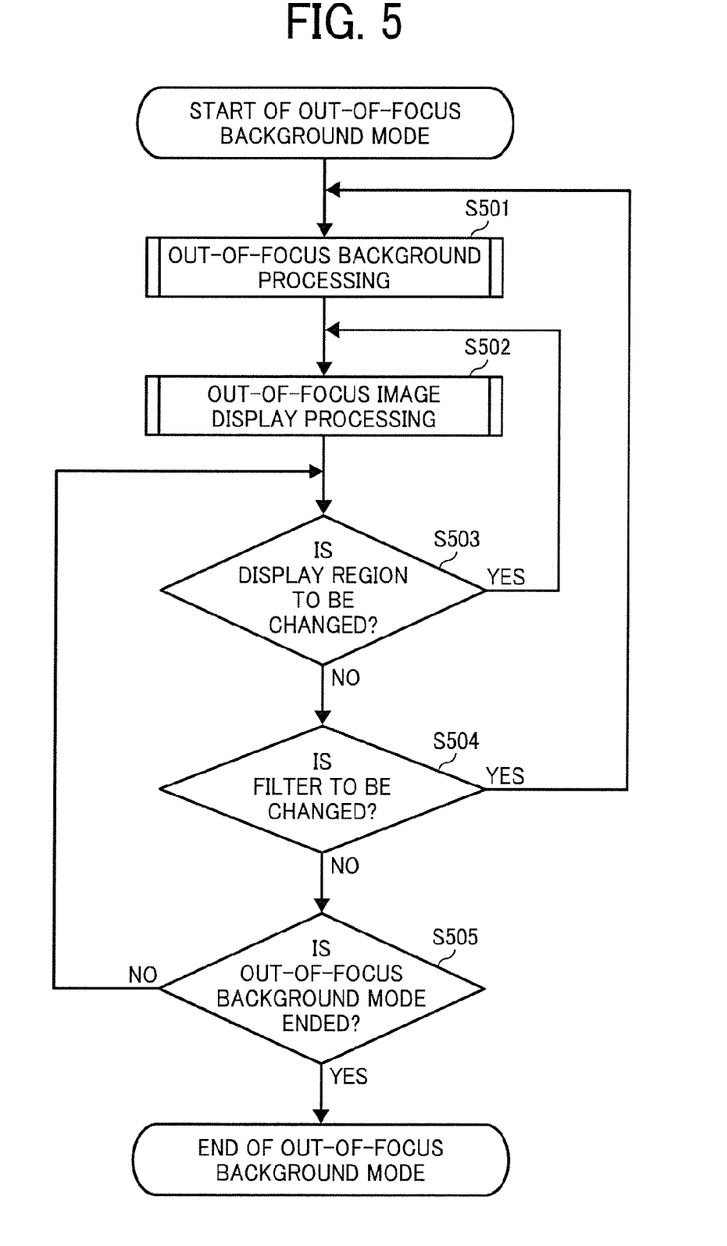
Figure 6:
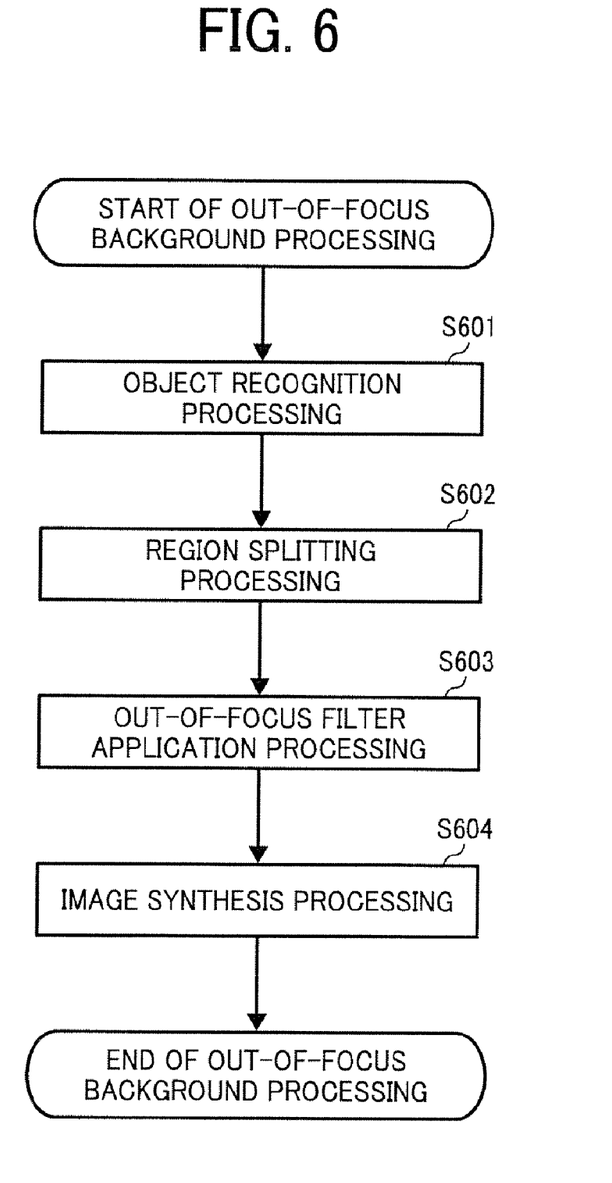

Next, the way to apply an out-of-focus background processing to the image file displayed in the display device will be explained by reference to FIGS. 4-6. The way to select the out-of-focus background processing is illustrated in FIGS. 4 and 5. In addition, the flow of the out-of-focus background processing is illustrated in FIG. 6.

Referring to FIG. 4, at first, the operator presses the MENU button 51 (Step S401) and selects the out-of-focus background processing in the displayed reproduction menu screen (Y in Step S402). When the out-of-focus background processing is selected, the out-of-focus background display processing is started (Step S403 and Step S502). Similar to Step S303, another processing is not performed until the out-of-focus background processing is not ended. If NO is selected in Step S402, it is determined whether the reproduction menu is to be ended (Step S404). If YES is selected in Step S404, the reproduction menu is ended. In NO is selected in S404, the reproduction menu selection processing is performed again (Step S401).

FIG. 5 is a flowchart for explaining the way to display an out-of-focus image and the display region and to change the blur filter after the out-of-focus background processing.

Figure 7:
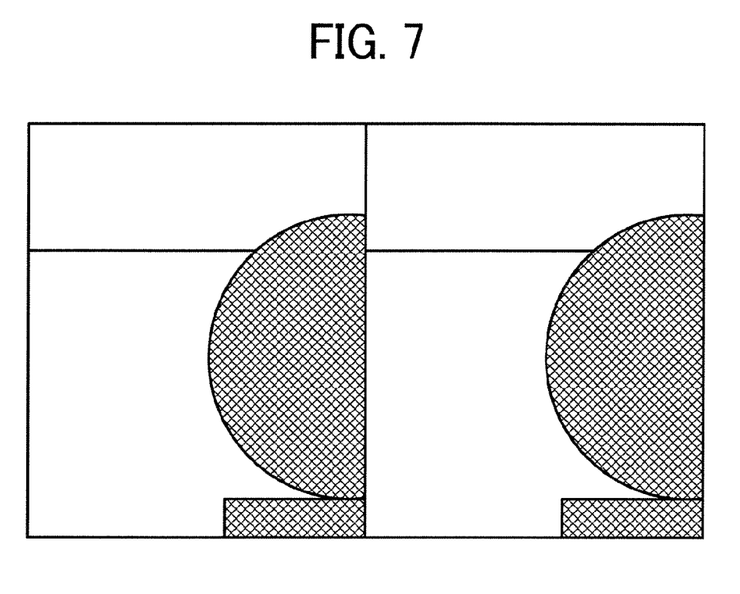
FIGS. 7 and 8 are schematic views of examples of the image displayed in the camera.
Figure 8:
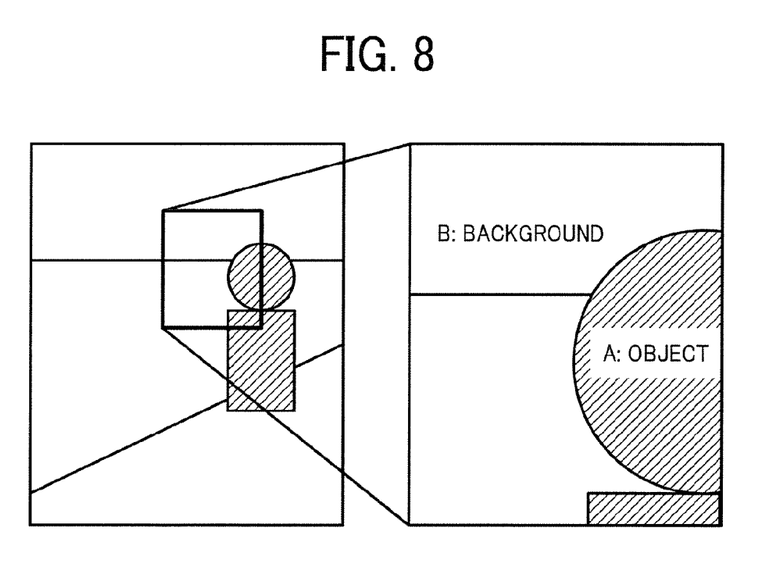

The out-of-focus background processing (Step S501) is performed on the basis of the currently set conditions (such as the filter to be used), and the image (i.e., out-of-focus image) produced by the out-of-focus processing is displayed (Step S502). The way to display the object region and background region in the thus displayed out-of-focus image is illustrated in FIGS. 7 and 8.

Next, it is determined whether the display region is changed (Step S503). If YES is selected in Step S503, the processing S502 is performed to set the display region. If NO is selected in Step S503, it is determined whether the filter used for the out-of-focus processing is changed (Step S504). If YES is selected in Step S504, the out-of-focus background processing of S501 is performed using the selected filter.

If the display region and the filer are not changed, it is determined whether or not the out-of-focus background processing mode is ended. If NO is selected in Step S505, the processing S503 is performed to determine whether or not the display region and the filter are changed. If the out-of-focus background mode is to be ended (Y in Step S505), the out-of-focus background mode is ended.

FIG. 6 is a flowchart for explaining the out-of-focus background processing.

At first, recognition of the object is performed and the object region and the background region are determined (Step S601). On the basis of the judgment in Step S601, region splitting is performed (Step S602), i.e., the image is divided into two image data (the object image data and the background image data). Specifically, the object region and background region (i.e., region other than the object region) are extracted from the image.

Next, each of the two image data is subjected to a filtering processing (Step S603). In this regard, the out-of-focus processing for the object region and the out-of-focus processing for the background region are different in strength of the filter. Specifically, a stronger filtering processing is performed on the background region, and a weak filtering processing is performed only on the outline of the object region. Thus, formation of an unnatural image in which the outline of the object and the background region are different in the degree of blurring is prevented. By synthesizing the two images, which are separated in Step S603, an out-of-focus image is formed (Step S604).

The object recognition processing and extraction processing are performed as follows. At first, the image data are split into mesh blocks. Next, information on the contrast and color of the image in each block is extracted. On the basis of the information on the contrast and color, the blocks included in the object region and the blocks included in the background region are detected. Then the region splitting processing (Step S602) is performed to produce two images, i.e., the object image and the background image. In the object recognition processing (Step S601), the blocks included in the object region are separated from the blocks included in the background region, resulting in separation of the object region from the background region at the boundary therebetween.

The thus produced two kinds of image data (i.e., the object image data and the background image data) are subjected to a blurring processing (Step S603). The two kinds of image data are then synthesized (Step S604), and an image with out-of-focus background is produced. In the out-of-focus filter processing, each of the two kinds of image data is subjected to a low pass filter processing, resulting in production of out-of-focus effect.

Next, the out-of-focus background display processing will be explained by reference to FIGS. 7 and 8. FIG. 7 illustrates the images displayed in the display device 53. In FIG. 7, the left image is the original image, which is not subjected to the out-of-focus background processing. The right image is the image with out-of-focus background. In this regard, as illustrated in FIG. 8, each of the left and right images in FIG. 7 is not the entire image, but is an image portion of the entire image, so that the effect of the out-of-focus background processing can be well recognized.

FIG. 8 illustrates the entire image (left image) and an enlarged image portion (right image), in which the effect of the out-of-focus background processing can be well recognized. The way to select the image portion is as follows. After the out-of-focus background processing, an image having a background region and an object region separated from the background region is illustrated. When an operator evaluates the out-of-focus effect, the operator considers the distance between the object and the background. Therefore, in this example, a portion surrounded by a square in the left image, in which the effect of the out-of-focus background processing can be well recognized, is selected as the image portion to be enlarged.

In this example, a boundary portion between the object region and the background portion, which has higher frequency components than the other boundary portions, and the vicinity thereof are displayed as the enlarged image portion. This is because the effect of a low pass filter can be recognized most effectively in such a portion having higher frequency components. If the operator wishes to display another region (boundary portion) to confirm the dependence of the degree of out-of-focus (blurring) on the distance between the object and the background, the desired region can be displayed in the display device 53. The method for changing the region to be enlarged is explained later. In this example, the region to be enlarged is determined on the basis of the information on the boundary portion obtained in the region splitting processing in the out-of-focus background processing.

Next, the method for changing the region to be enlarged will be explained. If the magnification of the enlarged region (image portion) displayed is not satisfactory, the operator can change the magnification by pressing the TELE button 43 or the WIDE button 42. Specifically, when the TELE button 43 is pushed, the magnification of the enlarged image portion is increased, i.e., the enlarged image is further enlarged. In contrast, when the WIDE button 42 is pressed, the magnification of the enlarged image portion is decreased. This processing of changing magnification can be applied to the two images (as illustrated in FIG. 7). Therefore, the operator can observe the same region of the original image and the synthesized image with out-of-focus background.

Further, by pressing the cross-form button 44-47, the region to be enlarged can be moved vertically and horizontally. Specifically, the region to be enlarged can be moved in the direction directed by the cross-form button while the display size is maintained. More specifically, when the RIGHT button 47 is pressed, a region on the right side of the currently displayed region can be displayed in the display device 53.

Next, the method for changing the filter in the out-of-focus background processing will be explained.

In this example, it is possible to select a blur filter while displaying two images as illustrated in FIG. 7. Specifically, when the operator presses the DISP button 52, the parameter information on the blur filters is displayed on the screen of the display device 53. When the filter changing page is displayed in the screen, change of the blur filter can be performed using the cross-form button 44-47. The parameters of the blur filter are the size and strength of the filter.

The method for changing the size of the blur filter is as follows. Specifically, when the size of the blur filter is enlarged, the larger out-of-focus effect can be produced. In contrast, when the size is reduced, the out-of-focus effect can be weakened. Similarly, the strength of the blur filter can be changed. When the strength is increased, the out-of-focus effect can be enhanced. When the strength is decreased, the out-of-focus effect can be weakened. Specifically, the operator can adjust the size of the blur filter using the UP and DOWN buttons 44 and 45 of the cross-form button when the filter changing page is displayed in the screen. In addition, the strength of the blur filter can be adjusted using the LEFT and RIGHT buttons 46 and 47 of the cross-form button when the filter changing page is displayed in the screen.

In this example, change of the parameters of the blur filter is performed using the cross-form button 44-47, but the changing method is not limited thereto. For example, it is possible to impart this function to buttons other than the cross-form button. In this case, the above-mentioned region to be displayed can be changed even in the parameter changing mode. When the operator presses the cross-form button 44-47 to change the parameters of the blur filter, the right image (i.e., the image with out-of-focus background) displayed in the screen of the display device 53 is renewed. Specifically, the last image, whose object region and the background region have been subjected to an blur processing, is subjected to a new blur processing using a new blur parameter. By using the object region and the background region thus subjected to the new blur processing, a new image is synthesized. The new image is displayed as the right image in the screen.

In this blur filter changing operation, it is possible that information on the current blur filter is displayed in the screen. In this case, the blur filter changing operation can be performed while the operator can confirm the conditions of the filter and the results of the blurring processing.

By pressing the DISP button 52, the filter changing operation can be ended. When the displayed image subjected to the blurring processing is acceptable, the operator presses the OK button 49 to store the image in a recording medium. Thus, the blurring processing mode is completed. The new image can be stored as a new image file different from the original image. Alternatively, the original image may be renewed by the new image.

EXAMPLE 2

In Example 1, a boundary region between the object region and the background region, which has high frequency components, is displayed so that the operator can confirm the effect of the blurring processing. However, it is possible that a portion of the background region, which is suitable for evaluating the effect of the blurring processing, as well as the boundary region, is displayed.

Specifically, in Example 2, a region including high frequency components in a largest amount is also selected from the entire image to be displayed in the screen so that the operator can well confirm the effect of the blurring processing. Example 2 is the same as Example 1 except that the method for determining the region to be displayed is different.

EXAMPLE 3

If the image does not have a boundary region to be displayed, which has high frequency components, in Example 1, the following method for determining the region to be displayed is used in Example 3. In this case, a portion of the background region including high frequency components most is displayed in the screen. When determining the region to be displayed, portions closer to the object region are evaluated faster to determine a portion suitable as the region to be displayed. The evaluation is performed until a portion suitable as the region to be displayed is found.

Example 3 is the same as Example 1 except that the method for determining the region to be displayed is different.

As mentioned above, the image subjected to a blurring (out-of-focus) processing is displayed while enlarged in the digital camera of the present invention, and therefore the effect of the blurring processing can be recognized better than in conventional digital cameras in which only a reduced image is displayed. In addition, a synthesized image is displayed while being compared with the original image, and therefore the effect of the blurring processing can be easily recognized. Further, the same portions of the synthesized image and the original image can be displayed in a screen by one operation, and therefore the desired portions of the synthesized image and the original image can be easily displayed in a screen. Furthermore, the same boundary portion of the images suitable for evaluating the effect of the blurring processing can be automatically displayed while enlarged in a screen, the operator can quickly recognize the effect of the blurring processing. Furthermore, another blurring processing is re-executed using a different filter parameter while the image subjected to the last blurring processing is displayed. Therefore, the operator can easily confirm the change of the blur filter parameter and the new image.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2007-194522, filed on Jul. 26, 2007, the entire contents of which are herein incorporated by reference.

What is claimed is:

1. An image processor comprising:
   an object extracting device configured to extract an object region from original image data;
   an object separating device configured to separate the extracted object region from another region;
   a first filtering device configured to subject the object region to an out-of-focus filtering processing and to output first image data;
   a second filtering device configured to subject the another region to an out-of-focus filtering processing and to output second image data;
   an image synthesizing device configured to synthesize the first image data and the second image data;
   a displaying device configured to display the synthesized image data and the original image data, which are not subjected to the out-of-focus filtering processing;
   a region splitting device configured to split the synthesized image data into plural regions;
   a high-frequency component obtaining device configured to obtain high-frequency components in each of the plural regions;
   a high-frequency component analyzing device configured to analyze the high-frequency components thus obtained by the region splitting device; and
   a zooming device configured to zoom a region among the plural regions, which has higher frequency components than the other regions of the plural regions.

2. The image processor according to claim 1, wherein the region splitting device splits a boundary zone between the object region and the another region of the synthesized image data into plural regions.

3. The image processor according to claim 1, wherein the region splitting device splits the another region of the synthesized image data into plural regions.

4. The image processor according to claim 1, further comprising:
   the high-frequency component obtaining device obtains high-frequency components in a portion of the another region when the high-frequency component analyzing device determines that no high-frequency components are obtained.

5. The image processor according to claim 1, further comprising:
   the high-frequency component obtaining device obtains high-frequency components in a portion of the object region when the high-frequency component analyzing device determines that no high-frequency components are obtained.

6. A digital camera comprising:
   a lens;
   a shutter;
   an image pick-up device configured to receive a light image formed by the lens and the shutter; and
   the image processor according to claim 1 configured to process image data of the light image.

7. A method for processing image data, comprising:
   operating an image processor to perform the steps of:
   extracting an object region from original image data;
   separating the extracted object region from another region;
   subjecting the object region to an out-of-focus filtering processing to output first image data;
   subjecting the another region to an out-of-focus filtering processing to output second image data;
   synthesizing the first image data and the second image data;
   subjecting the original image data to an out-of-focus filtering processing;
   splitting the synthesized image data into plural regions;
   obtaining high-frequency components in each of the plural regions;
   analyzing the high-frequency components; and
   displaying the synthesized image data and the original image data, which are not subjected to the out-of-focus filtering processing, while zooming a region among the plural regions, which has higher frequency components than the other regions of the plural regions.

* * * * *